United States Patent [19]
Davies

[11] Patent Number: 5,927,482
[45] Date of Patent: Jul. 27, 1999

[54] INSULATIVE COVER FOR ELECTRICAL SWITCHING APPARATUS FOR ELECTRIC POWER DISTRIBUTION SYSTEMS

[75] Inventor: Norman Davies, Irwin, Pa.

[73] Assignee: Eaton Corporation, Cleveland, Ohio

[21] Appl. No.: 09/120,080

[22] Filed: Jul. 21, 1998

[51] Int. Cl.⁶ ........................................... H01H 9/12
[52] U.S. Cl. ................................. 200/305; 174/51
[58] Field of Search ........................ 200/305; 174/51, 174/55 G, 35 MS, 35 GC; 206/719; 361/818, 799, 753

[56] References Cited

U.S. PATENT DOCUMENTS

| | | | |
|---|---|---|---|
| 4,780,584 | 10/1988 | Sakakino et al. | 200/305 |
| 5,311,408 | 5/1994 | Ferchau et al. | 361/818 |
| 5,471,184 | 11/1995 | Chien et al. . | |
| 5,493,084 | 2/1996 | Whitaker et al. . | |
| 5,508,670 | 4/1996 | Mantzouridis et al. . | |
| 5,597,991 | 1/1997 | Chen et al. . | |
| 5,603,196 | 2/1997 | Sohlstrom | 174/35 MS X |
| 5,661,279 | 8/1997 | Kenmochi | 200/305 X |

*Primary Examiner*—Renee S. Luebke
*Attorney, Agent, or Firm*—Martin J. Moran

[57] ABSTRACT

Electrical switching apparatus for an electric distribution system in which the apparatus has an insulative cover on it and a conductive metal layer on the inside of the cover, which is connected to ground.

12 Claims, 2 Drawing Sheets

INSULATIVE COVER FOR ELECTRICAL SWITCHING APPARATUS FOR ELECTRIC POWER DISTRIBUTION SYSTEMS

BACKGROUND OF THE INVENTION

1. Field of the Invention

This invention relates generally to electrical switching apparatus for electric power distribution systems and more particularly to such apparatus having insulative covers.

2. Background Information

Electrical switching apparatus used in electric power distribution systems include such devices as circuit breakers, network protectors, disconnect switches and transfer switches. Disconnect switches and transfer switches are often similar to circuit breakers but without the protective features. They are used to isolate loads and draw power from alternative sources, respectively.

Circuit interrupters such as circuit switching devices and circuit breakers are well known in the art. Circuit breakers are used to protect electrical circuitry from damage due to an overcurrent condition, such as an overload, and relatively high level short circuit conditions. Network protectors perform the function of circuit breakers and additional protective functions for networks within a distribution system.

Operator safety and control component grounding are critical issues with all of these switching devices. Many such devices are in metal cabinets or enclosures which are connected to ground to protect operators and provide equipment grounding. The metal frame and metal cover for such circuit breakers has provided a grounded dead front cover to meet these requirements. Newer circuit breakers and switches having insulative, molded plastic frames and covers do not provide a grounded front. The molded covers on such circuit breakers also do not provide a shield for electromagnetic forces that might adversely affect instrumentation in the circuit breakers or switches.

There is a need for a means to provide grounding and EMF shielding for low voltage circuit breakers having molded plastic covers on them.

SUMMARY OF THE INVENTION

The improved circuit breaker of this invention has met the above needs. The circuit breaker includes electrical contacts operable between a closed position in which a circuit is completed through the conductor and an open position in which the circuit through the conductor is interrupted. The circuit breaker further has a ground mechanism, which is connected via a grounding contact to the switchgear ground. The circuit breaker has a molded plastic cover on it for preventing contact by personnel with the electrical mechanisms in the breaker, and in accordance with this invention, has an electrically conductive layer on the inside surface of the plastic cover. The conductive layer is electrically connected to the ground mechanism to provide grounding for the cover.

In a preferred embodiment, the electrically conductive layer on the inside surface of the cover is a conductive metal that has been spray bonded to the inside surface of the cover. The preferred metal is zinc, but it may be copper, aluminum or other electrically conductive metals. The conductive layer is preferably connected to the grounded mechanism in the circuit breaker through a resilient metal clip. The clip can be secured to either the cover or the grounded mechanism and resiliently press against the other to provide an electrical connection therewith. In this way, the cover can be removed and replaced repeatedly and be effectively connected to ground without need to mechanically disconnect and re-connect the conductive layer to the ground mechanism.

BRIEF DESCRIPTION OF THE DRAWINGS

A full understanding of the invention can be gained from the following description of the preferred embodiment of the invention when read in conjunction with the accompanying drawings in which.

DESCRIPTION OF A PREFERRED EMBODIMENT

Figure 1:
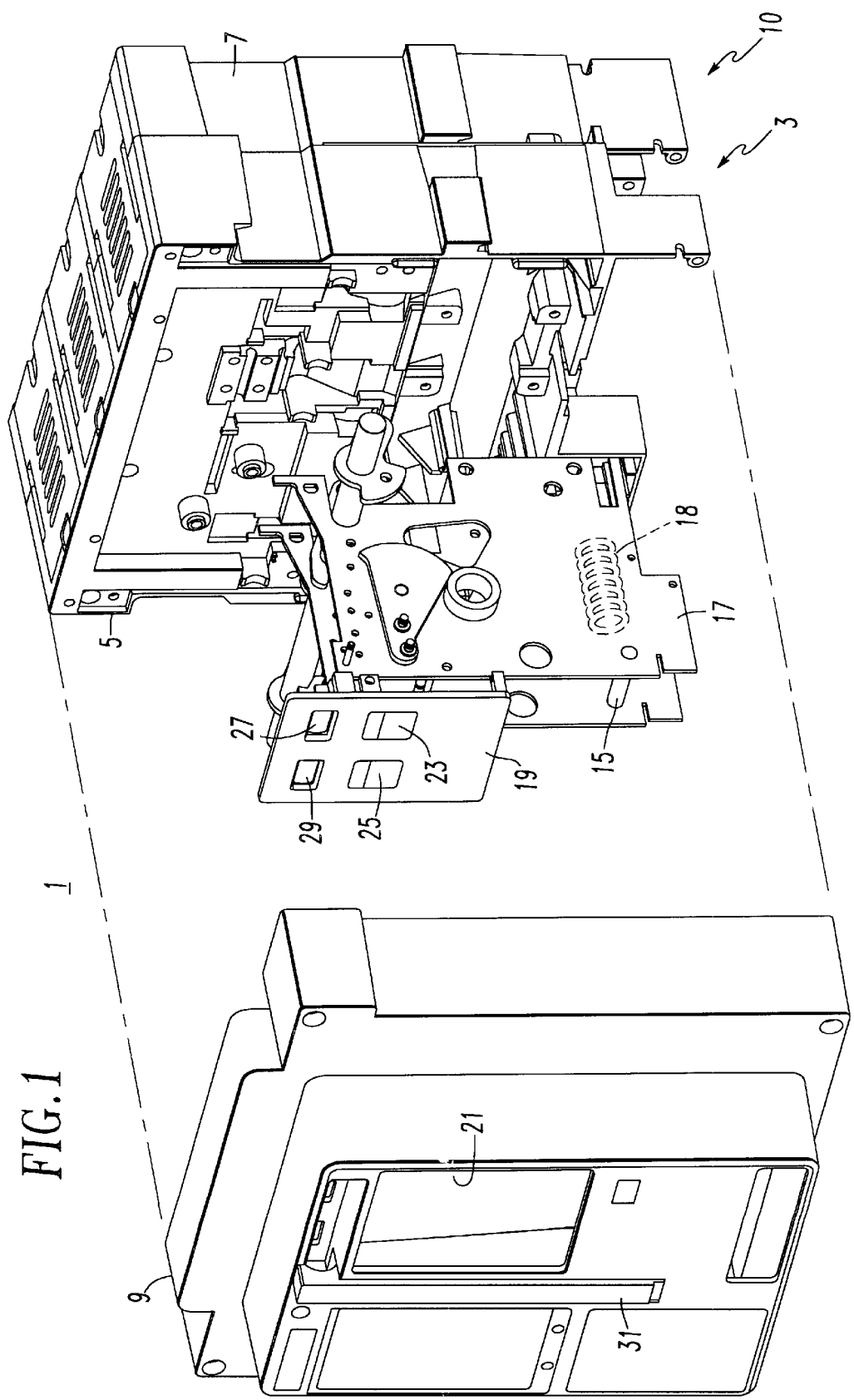
FIG. 1 is a perspective view of a low voltage circuit breaker exploded to show the cover in position to be secured to the front of the circuit breaker.

FIG. 1 shows a circuit breaker 1 of a type suitable for incorporation in the present invention. The circuit breaker 1 preferably includes a two-piece, molded plastic housing 3 that comprises a front cavity 5 and a rear cavity 7 in which operating mechanism 10 is secured. The front cavity 5 is secured to the rear cavity 7 by a plurality of screws. The circuit breaker further has a molded plastic cover 9 for covering the operating mechanism and to prevent contact with the operating mechanism by personnel or equipment. The front cavity 5 and cover 9 have matching holes in them for securing the cover 9 to the housing 3.

The operating mechanism 10 preferably includes a face plate 19 that is exposed through an opening 21 in the cover 9. The face plate 19 may include open and close buttons 23, 25 and open and close indicators 27, 29 on it.

The cover 9 has a charging handle 31 on it for charging the setting of a large spring 18 in the operating mechanism 10. The structural parts in the operating mechanism 10 are made primarily of a metal such as steel, and the electrical contacts in the mechanism are preferably made of conducting metals such as copper. The structure parts are electrically grounded through a ground contact (FIG. 2).

Figure 2:
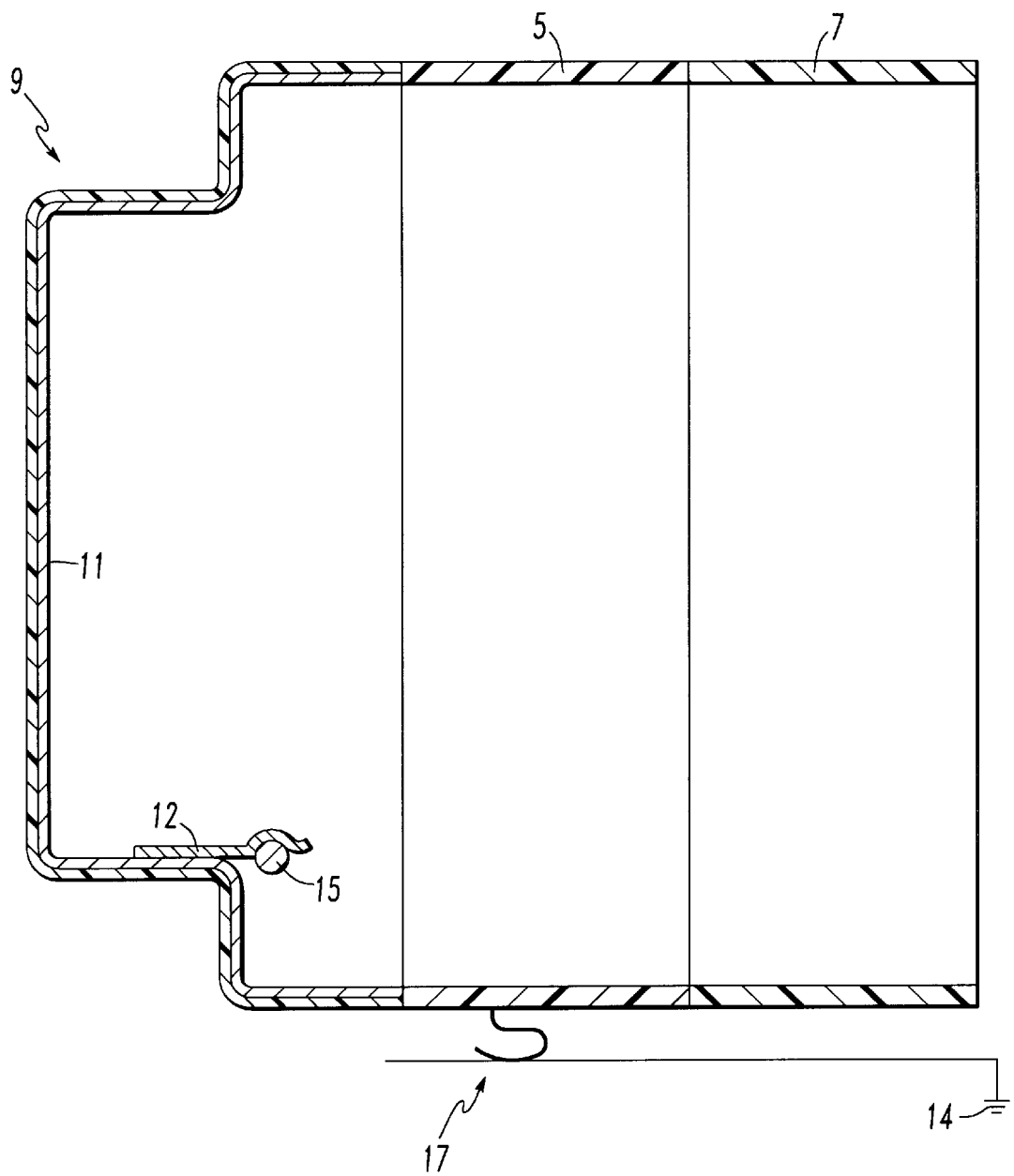
FIG. 2 is a schematic representation of a cross-section through the molded plastic frame and cover for the circuit breaker of FIG. 1 showing the grounded metal layer of this invention on the inside face of the cover.

In accordance with this invention, the cover 9 has an electrically conductive layer 11 on its inside surface, and the conductive layer is connected through the circuit breaker 1 to ground as shown in FIG. 2. The conductive metal layer 11 on the inside face of the cover 9 is preferably a sprayed on metal such as zinc, copper or aluminum. The metal layer 11 should preferably be about 0.010 to 0.030 inch thick to provide sufficient conductivity for effective grounding and shielding. Alternatively, the conductive layer may be sheet metal such as a metal foil or thin sheet metal that is pressed against the inside of the cover. The foil or sheet metal may be adhered to such face as with an adhesive so it will not be easily displaced from within the cover. Depending on the metal used, the foil should preferably be about 0.010 to 0.020 inch in thickness. Another possible alternative for the conductive layer is a conductive paint having a suitable thickness.

The electrical connection from the conductive layer 11 to the switchgear is preferably through a spring clip 12 of the type known in the art. As shown, the clip 12 is attached to the cover 9 as with a rivet, not shown, and makes resilient electrical contact with the grounded metal in the operating mechanism. The contact can be made by clip 12 resiliently engaging over conductive metal pin 15 in the operating mechanism. Alternatively, the clip could be attached to the grounded metal in the operating mechanism 10 and make resilient electrical contact with the conductive layer 11 on the cover 9. The operating mechanism 10 in the circuit breaker is connected to ground 14 as through a breaker contact shoe 17.

It is therefore seen that this invention provides an electrical ground and EMF shielding for an insulative cover on a circuit breaker. The ground for the EMF shield is in the form of an electrically conductive metal layer on the inside surface of the cover and a connection to ground such as through the operating mechanism in the circuit breaker.

While particular aspects of the present invention and a preferred embodiments have been described for purposes of illustration, it will be appreciated by those skilled in the art that numerous variations of the details may be made without departing from the invention as described in the appended claims. For example, the grounded insulative cover of this invention could be used on electrical power disconnect switches and circuit breakers of the type disclosed in U.S. Pat. Nos. 5,471,184 and 5,597,991, the disclosures of which are incorporated herein by reference.

What is claimed is:

1. In electrical switching apparatus for an electric power distribution system, said apparatus including an operating mechanism, a ground mechanism and a case having an insulative cover, the improvement comprising said insulative cover having an outside surface and an inside surface, said inside surface having an electrically conductive layer on it connected electrically to said ground mechanism in the switching apparatus.

2. Electrical switching apparatus as set forth in claim 1 in which said cover is a molded plastic cover.

3. Electrical switching apparatus as set forth in claim 1 in which said layer comprises metal foil disposed against said inside surface of said cover.

4. Electrical switching apparatus as set forth in claim 1 in which said layer comprises an electrically conductive metal spray bonded to said inside surface of said cover.

5. Electrical switching apparatus as set forth in claim 4 in which said metal is selected from a group comprising zinc, aluminum and copper.

6. Electrical switching apparatus as set forth in claim 4 in which said layer comprises metal paint on the inside of said cover.

7. Electrical switching apparatus as set forth in claim 1 in which said layer provides shielding against electric magnetic forces.

8. Electrical switching apparatus as set forth in claim 1, which is a low voltage power circuit breaker.

9. A power circuit breaker as set forth in claim 8 in which said conductive layer is connected to said ground mechanism by a resilient metal clip.

10. A low voltage power circuit breaker for responding to abnormal currents in a conductor in an electrical system, said circuit breaker comprising an operating mechanism, a ground mechanism and a case having an insulative cover on the case, said cover having a layer of conductive zinc covering its inside surface and electrically connected to said ground mechanism by a resilient metal clip.

11. A circuit breaker as set forth in claim 10 in which said cover is a molded plastic cover.

12. A circuit breaker as set forth in claim 11 in which said layer of conductive zinc has been sprayed on the inside surface of said molded plastic cover.

* * * * *